J. C. HOWELLS.
SPRING WHEEL.
APPLICATION FILED FEB. 16, 1912.
1,100,242.
Patented June 16, 1914.
2 SHEETS—SHEET 1.
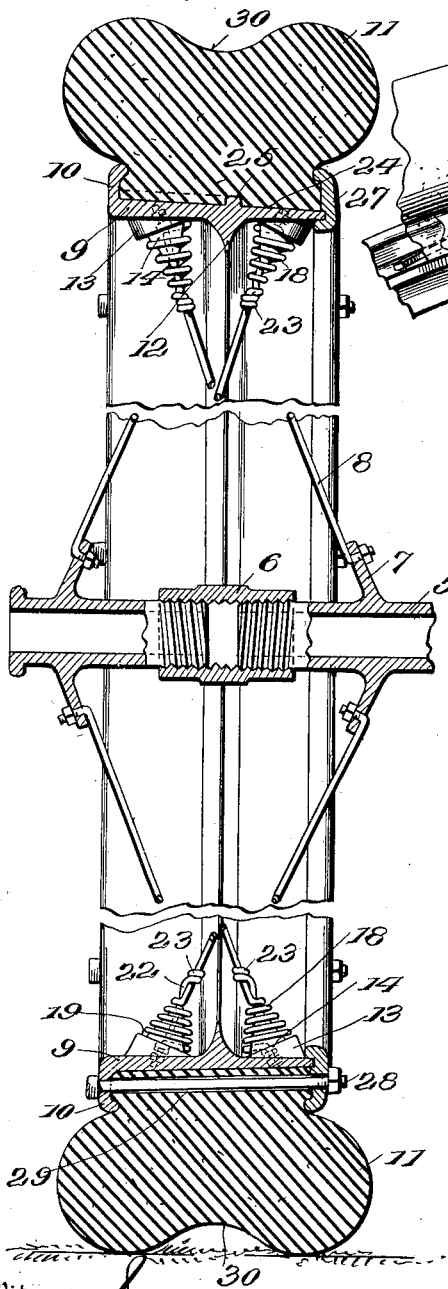
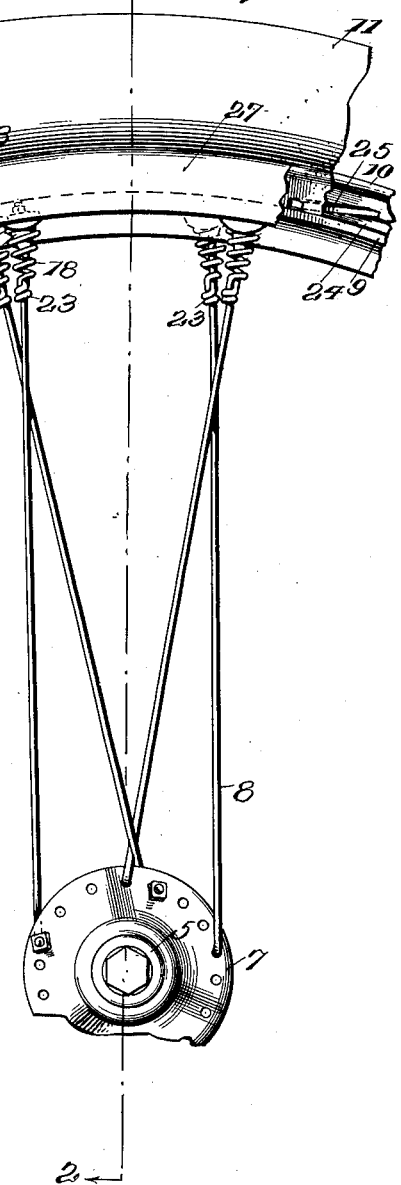
Inventor
J. C. Howells.

J. C. HOWELLS.
SPRING WHEEL.
APPLICATION FILED FEB. 16, 1912.
1,100,242.
Patented June 16, 1914.
2 SHEETS—SHEET 2.
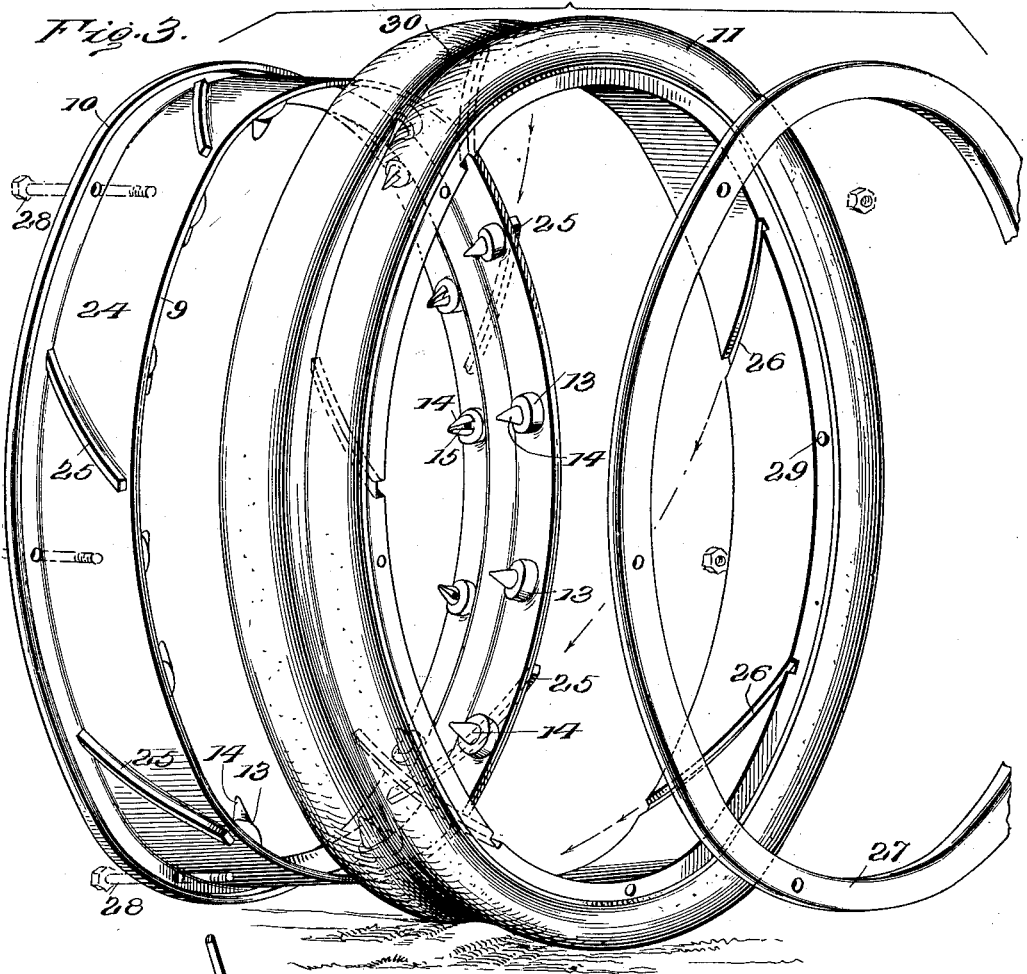
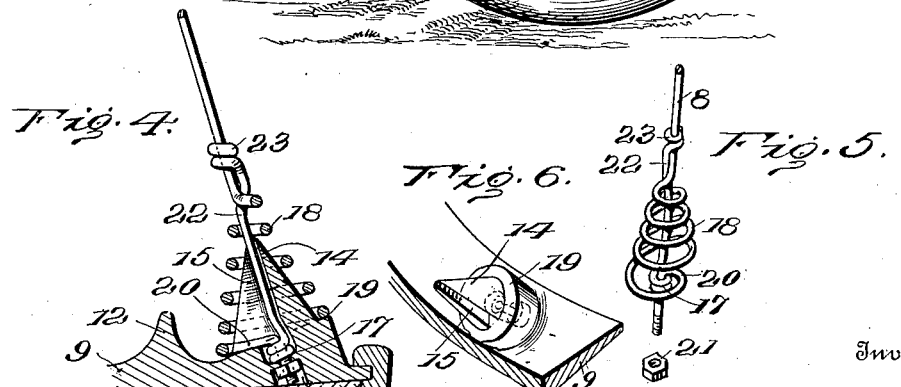

UNITED STATES PATENT OFFICE.

JOSEPH COBB HOWELLS, OF RENTON, WASHINGTON.

SPRING-WHEEL.

1,100,242. Specification of Letters Patent. Patented June 16, 1914.

Application filed February 16, 1912. Serial No. 678,140.

*To all whom it may concern:*

Be it known that I, JOSEPH C. HOWELLS, citizen of the United States, residing at Renton, in the county of King and State of Washington, have invented certain new and useful Improvements in Spring-Wheels, of which the following is a specification.

This invention relates to spring wheels, for automobiles, motorcycles and other vehicles and has for its object the provision of a strong, durable and thoroughly efficient wheel of this character which shall possess sufficient resilient properties to absorb all jars, strains and jolts imparted thereto incident to traveling over rough, uneven roads without the employment of the ordinary pneumatic or cushion tires.

A further object is to provide a resilient wheel, the spokes of which are formed with helical springs for attachment to the rim of the wheel, there being centering studs extending inwardly from the rim and projecting within the convolutions of said springs.

A further object is to provide the springs with automatic checking devices which serve to prevent undue expansion of the springs in case of an overload.

A still further object of the invention is generally to improve this class of devices, so as to increase their utility, durability and efficiency.

Further objects and advantages will appear in the following description, it being understood that various changes in form, proportions and minor details of construction may be resorted to within the scope of the appended claims.

For a full understanding of the invention and the merits thereof, reference is to be had to the following description and accompanying drawings, in which:

Figure 1 is a vertical sectional view of a spring wheel constructed in accordance with my invention, taken on the line 2—2 of Fig. 2 and showing the position of the springs when subjected to an overload. Fig. 2 is a side elevation of a portion of the wheel, showing the springs under normal condition, a portion of the tire being broken away to show the construction of the rim of the wheel; Fig. 3 is a perspective view of the rim, tire and retaining ring detached; Fig. 4 is an enlarged detail vertical sectional view, showing the construction of the checking device, and manner of securing the helical springs to the rim of the wheel; Fig. 5 is a detail perspective view of the lower portion of one of the spokes, showing the construction of the spring and checking device; Fig. 6 is a detail perspective view of one of the bosses and its conical stud.

Corresponding and like parts are referred to in the following description and indicated in all the views of the drawings by the same reference characters.

The resilient wheel forming the subject matter of the present invention comprises a hub 5, preferably formed in two sections having their inner ends provided with right and left hand threads, respectively, for engagement with a correspondingly threaded coupling member or collar 6. Each hub section is provided with an annular flange 7 having openings formed therein for the reception of the adjacent ends of the spokes of the wheel, indicated at 8. Spaced from the hub, is a rim 9 preferably tapered in cross section and provided with an integral retaining flange 10 for engagement with a tire 11. The inner face of the rim 9 is provided with a circumferential reinforcing rib 12 and disposed on opposite sides of said rib are spaced bosses 13 having conical shaped centering studs 14 projecting inwardly therefrom and converging in the direction of the hub of the wheel. Each stud 14 is provided with a slot 15, preferably extending the entire height of the stud and opening through the inner face of the rim of the wheel, as indicated at 16, there being a perforated diaphragm 17 connecting the walls of the recess 16 for the reception of the end of the adjacent spoke, as best shown in Fig. 4 of the drawings.

The spokes 8 are preferably formed of spring wire, the wire forming one end of each spoke being bent to form a helical spring 18 which freely encircles the adjacent conical stud. It will be observed that when the springs are in normal position, the lowermost or base convolution of each spring rests on an inclined shoulder 19 formed at the junction of the stud and the adjacent boss, while the remaining convolutions of the spring are normally spaced from the conical face of the stud and engaged thereagainst only when the spring is under compression. As previously set forth, the lower convolution of each spring normally rests on the adjacent shoulder 19, while the metal forming the terminal of said convolution is bent inwardly at 20 and thence extended through the perforation in the diaphragm 17 for engagement with a clamping nut 21, thus to firmly anchor the spring on the rim of the wheel.

From the foregoing, it will be apparent that the resistance offered the spokes will increase progressively with the compression of the springs 18, since the number of active convolutions of each spring 18 will be reduced as the lowermost springs are successively brought into engagement with the conical faces of the studs. It may be well to here explain that the studs are formed with a relatively broad base so that the tendency of the convolutions of the springs to expand when under pressure will be compensated for. It will here be noted that the conical studs 14 not only serve to center the springs on the bosses but also serve to prevent breakage of the shanks of the springs.

In order to prevent excessive expansion of the springs in case of an overload, there are provided suitable checking devices 22, each preferably formed of a single length of wire or other suitable material, one end of which is wrapped around the adjacent spoke to form a coil 23, while the other end thereof extends through the slot 15 in the stud and is coiled or wrapped around the lower convolution of the spring at the bend 20. Thus it will be seen that when the wheel is overloaded, the springs on the wheel near the road bed will be compressed, while the springs at the upper portion of the wheel will expand until the small convolutions of the springs engage the coils 23 of the checking devices when the springs will be automatically locked against further expansion, thus forming in effect rigid spokes. It is likewise obvious that should either end of the hub of the wheel strike a stump or other obstruction, which would have a tendency to dish or bend the spokes of the wheel laterally, the checking devices will automatically come to play and thus prevent the spokes from being dished. By making the springs 18 substantially conical in shape, the tension thereof gradually varies according to the weight of the load, that is to say, the convolutions of the springs will be successively nested on the studs as the weight of the load increases. These studs 14 also prevent side play of the springs and form guides for the springs when fastening the latter to the rim of the wheel.

Secured to or formed integral with the inclined or tapered face 24 of the rim, are spaced spirally disposed ribs 25 adapted to fit within correspondingly curved grooves 26 formed in the inner face of the tire 11. One end of each rib 25 abuts against the flange 10, while the other end thereof terminates short of the outer face of the rim to permit the attachment of a removable retaining ring 27. The ring 27 is secured in position on the tire by means of bolts or similar fastening devices 28, which latter pass through registering openings in the ring 27 and flange 10 and through suitable slots 29 formed in the tire, as shown.

The tire 11 is preferably provided with a circumferential depression or cavity 30. Should the spokes of the wheel become loose for any reason, said spokes may be readily tightened by rotating the coupling member 6 which expands the hub sections and effects the tightening of the spokes, as will be readily understood.

A wheel constructed in accordance with this invention will cause the tire thereof to hug the ground and reduce vibration of the body of the vehicle to a minimum, especially when traveling over rough, uneven roads. It will of course be understood that the wheels may be made in different sizes and shapes and provided with any desired number of spokes, without departing from the spirit of the invention.

Having thus described the invention, what is claimed as new is:

1. A wheel including a rim having bosses formed thereon and inclined toward the middle plane of the rim, a hub spaced from said rim, intersecting spokes rigidly secured to the hub and rim, respectively, and each having a portion thereof bent to form a helical spring freely engaging the adjacent boss throughout the major portion of its length, and a checking device operating within the convolutions of the spring of each spoke for controlling the expansion thereof, said springs being disposed in longitudinal alinement with the spokes and serving to receive the direct thrust thereof.

2. A wheel including a rim having spaced bosses thereon and each provided with a conical stud having a slot therein, a hub, spokes forming a yieldable connection between the hub and rim of the wheel, one end of each spoke being bent to form a helical spring, the lower convolution of which rests on the adjacent boss, and a checking device operating within the slot of each stud and engaging the spokes above and below the springs thereof for automatically controlling the expansion of said spring in case of an overload.

3. A wheel including a rim having its inner face provided with a circumferential reinforcing rib, there being spaced bosses formed on opposite sides of the rib and provided with inclined shoulders defining conical-shaped slotted studs, a hub, spokes forming a connection between the hub and rim of the wheel and each provided with a helical spring encircling the stud and bearing against the inclined shoulder of the adjacent boss, one end of each spring being provided with an angular extension for attachment to the rim, and a checking device extending through the slot in each stud and engaging the spoke on opposite sides of the spring.

4. A wheel including a rim and having spaced bosses formed on the inner face thereof and provided with an inclined shoulder defining a substantially conical-shaped stud, there being a slot formed in each stud and opening through the outer face of the rim, a perforated partition formed in the rim at each boss, a hub, spokes forming a connection between the hub and rim of the wheel and each having one end thereof bent to form a helical spring encircling the adjacent conical stud, the lower convolution of each spring being threaded and extending through the perforation in the adjacent partition for engagement with a fastening device, and a checking device operating within each spring and each formed of a single length of wire having one end thereof rigidly secured to the lower convolution of the spring at said partition and its other end extended through the slot in the stud and loosely wrapped around the adjacent portion of the spoke.

5. A wheel including a rim having spaced bosses thereon each provided with a stud inclined toward the middle plane of the rim, a hub, spokes forming a yieldable connection between the hub and rim of the wheel and having their opposite ends rigidly secured to the hub and rim, respectively, one end of each spoke being bent to form a coiled spring disposed in alinement with the adjacent spoke and receiving the direct thrust thereof, the lower convolutions of the springs resting on the bosses and a checking device extending through the convolutions of each spring and engaging the spokes above and below the springs thereof for automatically controlling the expansion of said springs in case of an overload.

In testimony whereof I affix my signature in presence of two witnesses.

JOSEPH COBB HOWELLS. [L. s.]

Witnesses:
J. D. YOAKLEY,
SAMUEL N. ACKER.

Copies of this patent may be obtained for five cents each, by addressing the "Commissioner of Patents, Washington, D. C."